June 18, 1935. W. R. GUIBERSON 2,005,259
OIL SAVER
Filed Aug. 28, 1933 4 Sheets-Sheet 1

Inventor
William R. Guiberson
By Jack A. Ashley
Attorney

June 18, 1935.  W. R. GUIBERSON  2,005,259
OIL SAVER
Filed Aug. 28, 1933   4 Sheets-Sheet 3

Inventor
William R. Guiberson

By  Jack A. Athley
Attorney

June 18, 1935.  W. R. GUIBERSON  2,005,259
OIL SAVER
Filed Aug. 28, 1933  4 Sheets-Sheet 4

Inventor
William R. Guiberson
By Jack A. Ashley
Attorney

Patented June 18, 1935

2,005,259

UNITED STATES PATENT OFFICE 2,005,259

OIL SAVER

William R. Guiberson, Dallas, Tex., assignor to The Guiberson Corporation, Dallas, Tex., a corporation of Delaware Application August 28, 1933, Serial No. 687,133

2 Claims. (Cl. 286—16)

This invention relates to new and useful improvements in oil savers.

One object of the invention is to provide an improved oil saver for use on cable, rods and the like, in connection with oil and gas wells, whereby certain advantageous results are obtained.

Another object of the invention is to provide an improved housing structure, whereby manufacturing is simplified and cost is reduced and the device is made more compact and substantial.

Still another object of the invention is to provide an improved oil saver of the split housing type, having a positive guide means for the packing members, whereby buckling of said members is prevented, and also whereby binding of the same against the side walls of the housing, during the adjusting operation, is prevented.

A further object of the invention is to provide an improved housing structure, wherein the packing chamber within said housing is lined with Babbitt metal, or other soft metal or suitable material, thereby eliminating the expense of machining said chamber, the babbitt providing a smooth operating surface for the packing members.

A still further object of the invention is to provide an improved guide means for the packing members, whereby shifting or wobbling of said members is prevented.

A construction designed to carry out the invention will be hereinafter described, together with other features of the invention.

The invention will be more readily understood from a reading of the following specification and by reference to the accompanying drawings, in which an example of the invention is shown, and wherein.

Figure 1:
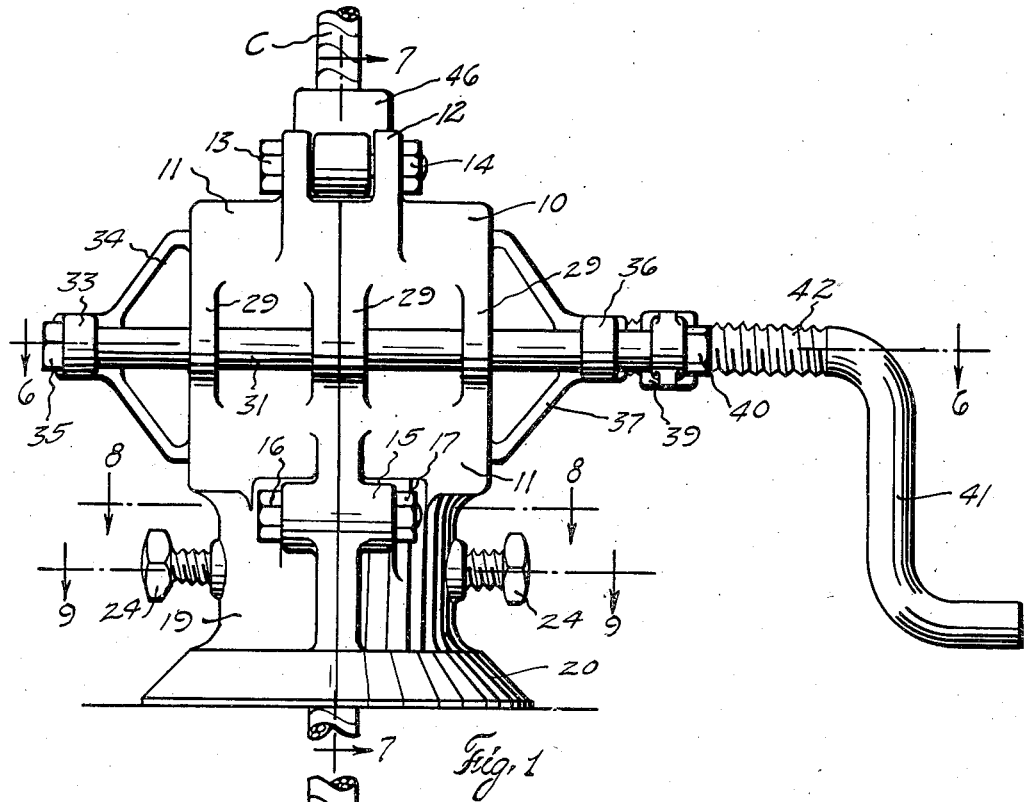
Figure 1 is a side elevation of an oil saver constructed in accordance with the invention.
Figures 8, 9:
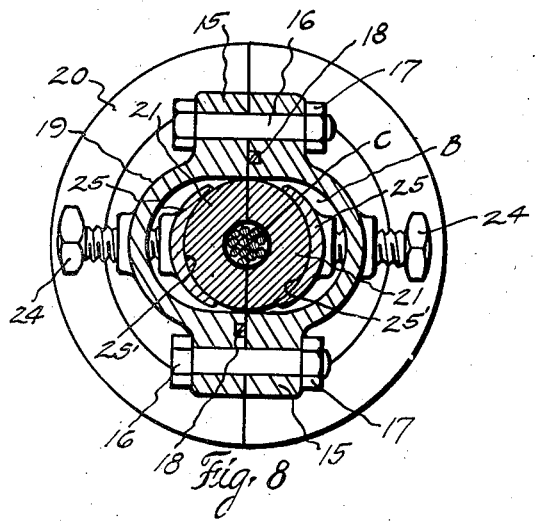
Figure 7:
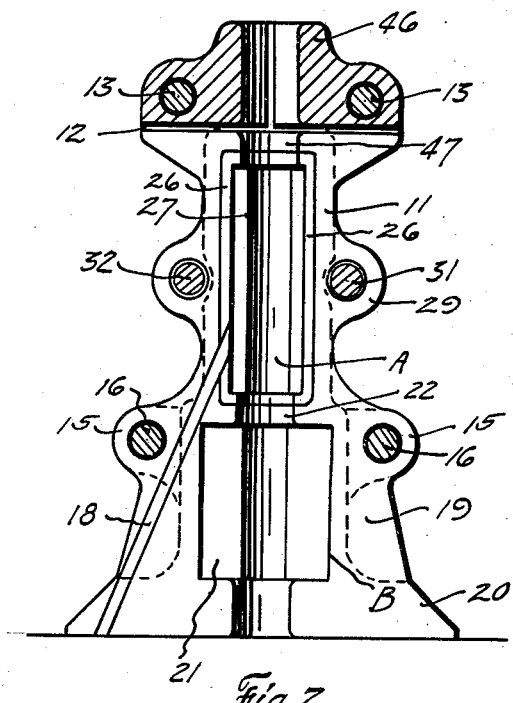
Figure 11:
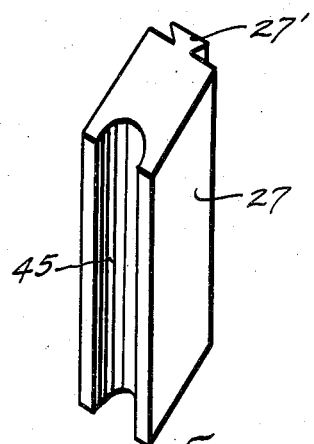
Figure 10:
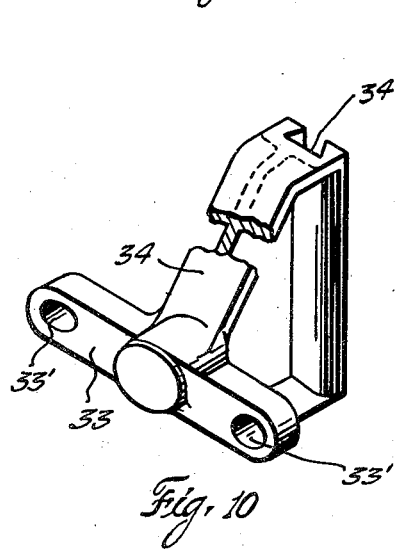
Figure 12:
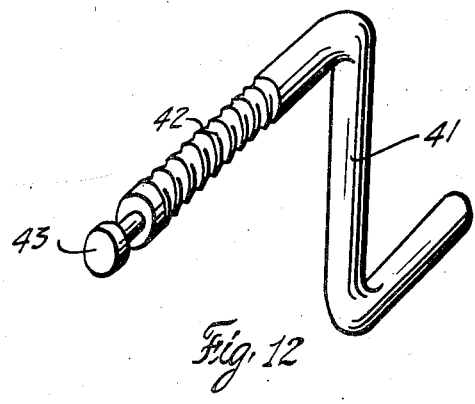

Figure 7 is a view showing one of the housing sections in elevation and the connecting parts in section, Figure 8 is a horizontal cross-sectional view taken on the line 8—8 of Figure 1, Figure 9 is a view similar to Figure 8 and taken on the line 9—9 of Figure 1, Figure 10 is a perspective view of one of the followers, Figure 11 is a perspective view of the packing blocks, and Figure 12 is a perspective view of the operating crank.

In the drawings the numeral 10 designates a split housing. The members 11 of the housing are provided with upwardly extending ears 12 at their upper ends, and are fastened together by bolts 13 and nuts 14. Ears 15 extend outwardly from each member near its lower end and these ears receive bolts 16 which have nuts 17 secured on their ends, whereby the members 11 of the housing are rigidly secured together. Suitable packing strips 18 (Figure 7) are interposed between the housing members.

Figure 5:
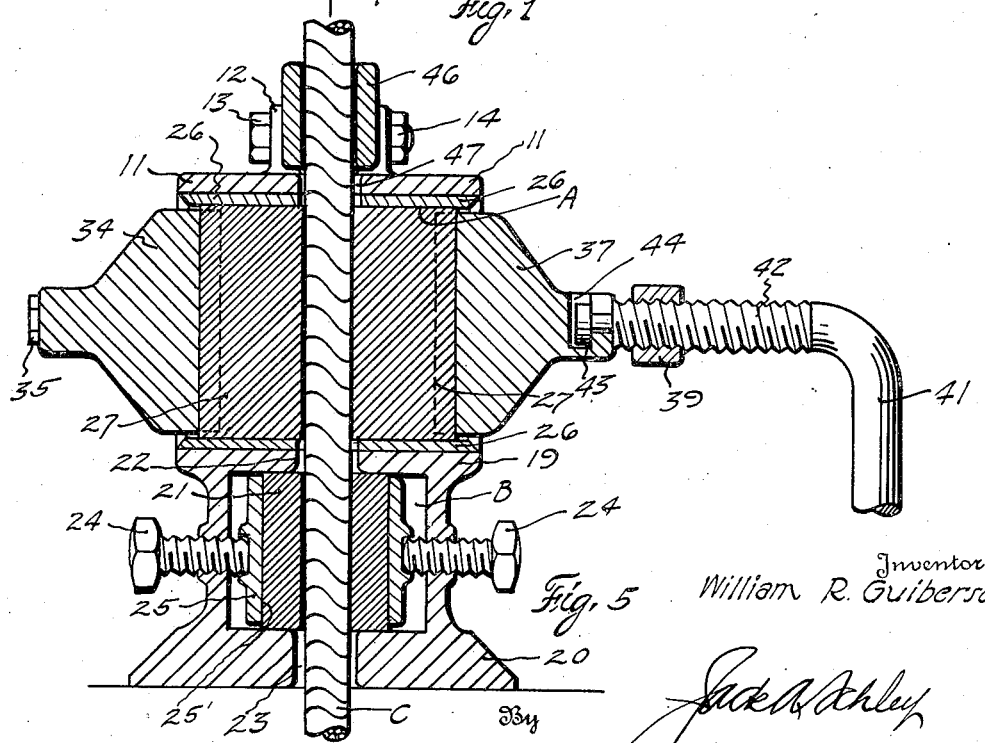
Figure 5 is a transverse vertical sectional view, taken on the line 5—5 of Figure 2.
Figure 2:
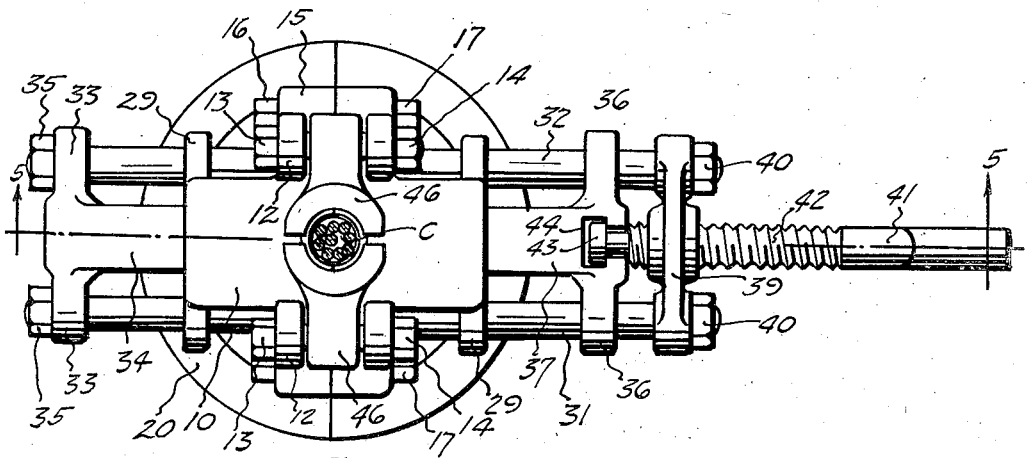
Figure 2 is a plan view of the same.

As is best shown in Figure 5, the housing includes an upper packing chamber A and a lower packing chamber B. The lower chamber B is positioned within an enlarged base 19 which has an annular beveled flange 20 at its lower end for suitably supporting the device on a casing head.

A cylindrical split packing member or sleeve 21 fits in the lower chamber B (Figures 5 and 8), and is retained therein between a reduced opening 22 at the upper end of the base and a similar opening 23 at the bottom thereof. The cable C, or other element which passes through the device, passes through the opening 22, through the sleeve 21, and through the opening 23. It is pointed out that the top of the base 19 forms the top of the chamber B, as well as the bottom of the chamber A.

Adjusting screws 24 are positioned diametrically opposite each other (Figures 5, 8 and 9) and are threaded through the outer walls of the base 19. The inner ends of the screws engage shoes 25 which have their inner faces 25' concave, to embrace opposite sides of the cylindrical packing sleeve 21. By rotating the screws in a clockwise direction, the shoes are displaced inwardly, thereby compressing the split sleeve about the cable C.

One of the important features of the invention is the construction of the packing chamber A. It is pointed out that the housing is split vertically and at right angles to the plane of the chamber and thus divided into the two complementary members 11. By this arrangement, each member has its individual portion of the packing chamber and when said members are fitted together, as shown in Figures 1 and 5, these portions are alined with each other to form the chamber A. Thus, it is possible to line each portion with Babbitt metal 26, whereby a smooth inner surface of the chamber is had without the necessity of machining the same. Heretofore, the housing has been split parallel to the plane of the chamber and machining of the contacting faces was necessary so as to assure a perfect fit between said members. This perfect fit was essential because rectangular packing blocks 27 are slidable in the chamber A, and if the members did not fit together perfectly the chamber would be out of alinement and the packing blocks would bind and jam within the chambers.

It is seen that by splitting the housing at right angles to the plane of the chamber, as shown in the drawings, it is possible to line the chamber with Babbitt metal, and thus provide a smooth surface for the blocks to slide on at a much less cost. When the babbitting wears or becomes rough, it is only necessary to replace the same, which is a simple and inexpensive operation, whereas in the old type it was necessary to again machine the walls of the chamber A.

For operating the blocks 27 to engage or disengage the cable C, or other element, passing through the device, a floating or self-adjusting packing mechanism is provided. Guide ears or eyes 29 are positioned on the outer sides of the housing members. A yoke 30, embracing the housing on each side thereof, is freely slidable horizontally in the guide ears 29. The yoke includes a pair of tie rods 31 and 32.

Figure 6:
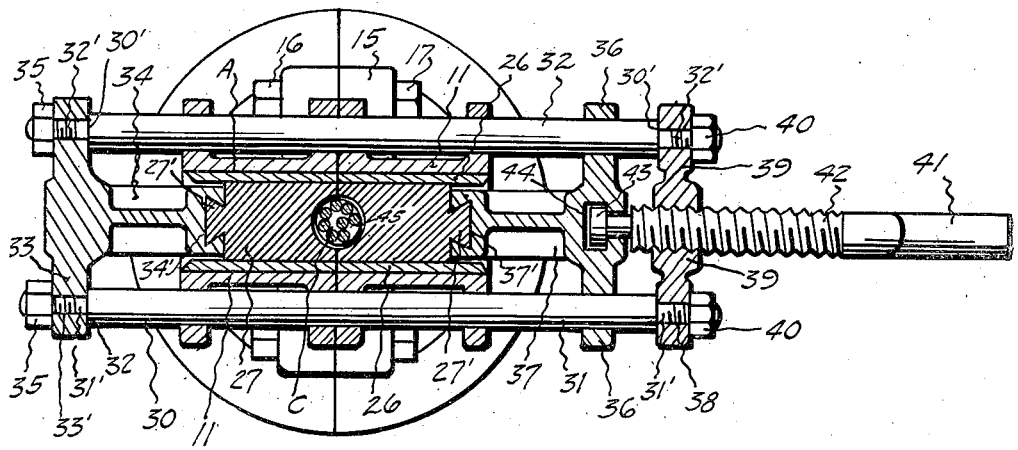
Figure 6 is a horizontal cross-sectional view taken on the line 6—6 of Figure 1.

Each end of the rod 31 has a reduced portion 31', whereby shoulders 32 are formed near the outer ends of the rods. One end of the rod has its reduced portion engaged in an opening 33' of a bracket 33 extending outwardly from a follower 34. The outer end of the reduced portion is screw-threaded to receive a nut 35 which securely holds the bracket against the shoulder 32, as is clearly shown in Figure 6. The rod 31 passes through a bracket 36 extending outwardly from a second follower on the opposite side of the housing, and the other end of said rod has its reduced portion 31' engaged in an opening 38 of a crosshead 39. A nut 40 on the outer end of the reduced portion securely holds the crosshead against the shoulder 32.

The rod 32 is an exact duplicate of the rod 31 and has reduced portions 32' at its ends. The rod passes through the bracket 36 extending outwardly from the follower 37, and shoulders 36' formed on the rod 32 by the reduced portions at its ends are held against the bracket 33 on the follower and against the crosshead 39 by nuts 35 and 40. A crank 41 is provided with a screw-threaded stem 42 threaded through the central portion of the crosshead. On the inner end of the stem, a head 43 is rotatably confined in a slotted keeper 44 of the follower 37.

The followers 34 and 37 are provided with upright dovetailed grooves 34' and 37' respectively, for receiving therein a dovetailed rib 27' (Figure 9) on the outer end of each rectangular packing block 27. Each block is formed of rubber, or any material suitable for the purpose, and has an inner concave, vertical face or seat 45 for engaging around the cable C.

Figure 3:
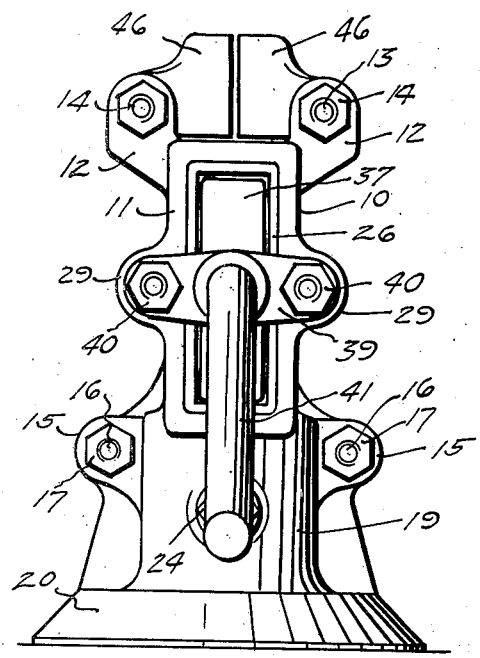
Figure 3 is an end elevation of the same.
Figure 4:
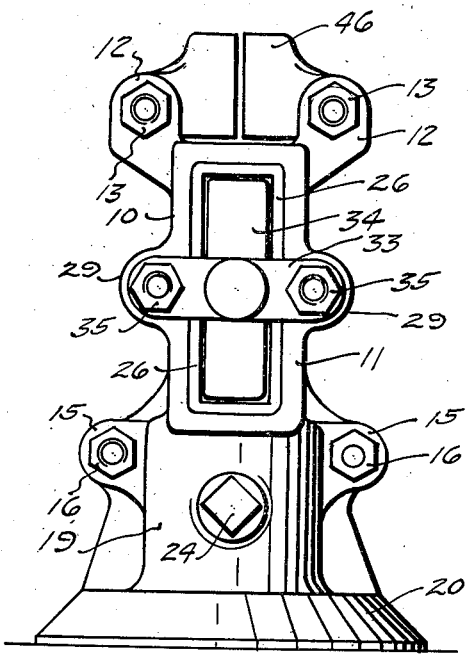
Figure 4 is a view similar to Figure 3 and looking at the opposite end of the saver.

When the oil saver is mounted on the casing head or other support at the well, the cable C (Figure 3) will extend through the housing 10, and the seats 45 of the packing blocks will be located on each side of said cable. By grasping the handle of the crank 41, the operator may pull the yoke toward him, whereby the block 27 carried by the follower 34 will be engaged with the cable. It is noted that the yoke has a free horizontal movement in the guide ears 29, but vertical movement of said yoke is prevented.

Rotation of the crank 41 in a clockwise direction will cause the follower 36, together with its packing block 27 to advance within the chamber A. It is obvious that the inward movement of the followers will clamp the packing blocks about the cable, and by the location of the head 43 of the crank stem 42 at the center of the follower 37, the inward pressure will be evenly distributed to the packing blocks, causing said blocks to automatically adjust themselves for equal gripping of the cable throughout its length.

By rigidly securing one end of the rods 31 and 32 to the follower 34 and their opposite ends to the crosshead 39, and by supporting said rods in the guide ears 29, it is seen that the yoke is capable of movement only as a unit. Since the rods have a sliding fit in the ears 29, the yoke can only move horizontally. All wobbling of the yoke is eliminated, thereby assuring that the motion transmitted to the packing blocks 27 through said yoke is in a direct horizontal line. This will prevent the blocks from moving out of alinement during the adjusting operation, thereby preventing said blocks from binding or jamming against the inner walls of the chamber A.

A pair of guide blocks 46 are pivotally mounted in the housing 10 above the chamber A on the bolts 13. These blocks are preferably made of bronze, although the invention is not to be so limited. By making the blocks of bronze, the fire hazard, created by the steel cable or rod passing through the device, rubbing against steel blocks and throwing sparks, is eliminated. The bronze guides also make for longer wear. Recesses 47 are also provided in the members 11 for the passage therethrough of the cable C which is guided by the blocks into the housing.

After continued use of the oil saver and when the yoke 30 has worked as far out on the stem 42 of the crank as is possible, the packing will have been completely worn out and further inward movement of the followers will be prevented. The operator will then know the packing must be replaced.

When it becomes necessary to replace the packing blocks, it is merely necessary to unscrew the nuts 35 and disengage the rods 31 and 32 from the followers. The followers can then be removed from the housing and new packing blocks inserted in place of those worn out. This dis-assembling of the yoke can be accomplished quickly and easily without disconnecting the housing. When the new packing has been secured to the followers, the rods are again replaced. By mounting the rods in the guide ears 29 the yoke, which is rigid, is capable of only a horizontal sliding movement, thereby preventing the packing blocks and the followers from bending or jamming against the inner walls of the chamber A.

The description which has been given recites more or less detail of a particular embodiment of the invention, which is set forth as new and useful, however, I desire it understood that the invention is not limited to such exact details of construction, because it is manifest that changes and modifications may be made, within the scope of the appended claims, without departing from the spirit of the invention.

What I claim and desire to secure by Letters Patent, is:

1. An oil saver comprising, a housing having a vertical passage therethrough for receiving a reciprocating element and also having a transverse packing chamber, the chamber of the housing being lined with soft metal to provide smooth working surfaces, elastic packing blocks slidable on the smooth working surfaces of the chamber arranged for engagement with a reciprocating element passing through the housing, followers attached to the blocks, a pair of rods slidable on the outer sides of the housing, each rod having one end attached to one of the followers and slidably connected with the other follower, a crosshead connecting the other ends of the rods, and an adjusting screw threaded through the crosshead and rotatably attached to the follower with which the rods are slidably connected.

2. An oil saver comprising, a housing having a vertical passage therethrough for receiving a reciprocating element and also having a transverse packing chamber, the chamber of the housing being lined with soft metal to provide smooth working surfaces, elastic packing blocks slidable on the smooth working surfaces of the chamber arranged for engagement with a reciprocating element passing through the housing, followers attached to the blocks, a pair of rods slidable on the outer sides of the housing, each rod having one end attached to one of the followers and slidably connected with the other follower, a crosshead connecting the other ends of the rods, an adjusting screw threaded through the crosshead and rotatably attached to the follower with which the rods are slidably connected, the rods being round and the housing having eyes at each end of its chamber in which the rods are slidably supported.

WILLIAM R. GUIBERSON.